(12) United States Patent
Celik et al.

(10) Patent No.: US 7,277,268 B2
(45) Date of Patent: Oct. 2, 2007

(54) LAMINATED CERAMIC CAPACITOR

(75) Inventors: Cesur Celik, Québec (CA); Serge Grenier, Québec (CA)

(73) Assignee: Candian Electronic Powers Corporation, Quebec (CA)

( * ) Notice: Subject to any disclaimer, the term of this patent is extended or adjusted under 35 U.S.C. 154(b) by 0 days.

(21) Appl. No.: 10/826,681

(22) Filed: Apr. 16, 2004

(65) Prior Publication Data

US 2004/0256603 A1 Dec. 23, 2004

Related U.S. Application Data

(63) Continuation of application No. PCT/CA02/01585, filed on Oct. 18, 2002.

(30) Foreign Application Priority Data

Oct. 18, 2001 (CA) .................................. 2359347

(51) Int. Cl.
  *H01G 4/008* (2006.01)
  *H01G 4/30* (2006.01)
(52) U.S. Cl. ................. 361/305; 361/301.4; 361/306.3
(58) Field of Classification Search ................. 75/255; 361/305, 301.4, 306.3; 252/512, 513
See application file for complete search history.

(56) References Cited

U.S. PATENT DOCUMENTS

| 3,502,463 | A | * | 3/1970 | Holtz, Jr. ..................... 75/236 |
| 3,872,360 | A | * | 3/1975 | Sheard ........................ 361/305 |
| 4,060,663 | A | * | 11/1977 | Merz et al. .................. 428/428 |
| 4,241,378 | A | * | 12/1980 | Dorrian ....................... 361/305 |
| 5,438,232 | A | * | 8/1995 | Inoue et al. ................. 310/328 |
| 6,162,277 | A |   | 12/2000 | Toshima et al. |
| 6,185,087 | B1 | * | 2/2001 | Park et al. ................. 361/321.4 |
| 6,316,100 | B1 | * | 11/2001 | Kodas et al. ............... 428/357 |
| 6,530,972 | B2 | * | 3/2003 | Akimoto et al. ............. 75/351 |

FOREIGN PATENT DOCUMENTS

| EP | 1026268 |   | 8/2000 |
| JP | 11-67588 | * | 3/1999 |
| JP | 411067588 | * | 3/1999 |
| JP | 11-92807 | * | 4/1999 |
| JP | 11-124606 | * | 5/1999 |

OTHER PUBLICATIONS

Patent Abstracts of Japan, vol. 015, No. 250 (E-1082), Jun. 26, 1991 & JP03078906 A (Furukawa Electrric Co LTD: THE), Apr. 4, 1991, abstract.

Patent Abstracts of Japan, vo. 2000, No. 12, Jan. 3, 2001 & JP2000269162 A (Miyakai Tamon), Sep. 29, 2000, abstract.

Tony Addona, Pierre Auger, Cesur Celik and Gangqiang Chen, Nickel and Cooper Powders for High Capacitance MLCC Manufacture, Nooranda Advance Materials, Mar. 15, 1999, pp. 39-44, XP009003242.

* cited by examiner

*Primary Examiner*—Roy King
*Assistant Examiner*—Ngoclan T. Mai
(74) *Attorney, Agent, or Firm*—Martin Fleit; Paul D. Bianco; Fleit Kain Gibbons Gutman Bongini & Bianco P.L.

(57) ABSTRACT

A metal alloy powder containing at least two alloying elements selected from the group of Ni, Cu, Cr, Sn, Mn, Co and W containing 1 to 99% by weight Ni, 1 to 99% by weight Cu, 6 to 60% by weight Cr, 6 to 15% by weight Sn, 6 to 15% by weight Mn, 6 to 15% by weight Co, and/or 6 to 15% by weight W for use in laminated ceramic capacitors with an internal electrode wherein said electrode comprises a sintered body of said alloy powder. A metal alloy powder containing at least two alloying elements selected from the group of Ni, Cu, Cr, Sn, Mn, Co and W wherein the onset of oxidation of the alloy powder occurs above about 250° C.

8 Claims, 3 Drawing Sheets

US 7,277,268 B2

LAMINATED CERAMIC CAPACITOR

RELATED APPLICATION

This application is a continuation of International Application No. PCT/CA02/01585 filed Oct. 18, 2002, which is here incorporated by reference in its entirety.

BACKGROUND OF THE INVENTION

Field of the Invention

The present invention relates to laminated ceramic capacitors also known as multi layered ceramic chip capacitors (MLCC), and particularly to the internal electrode material used in the fabrication of such capacitors.

Multi layered ceramic chip capacitors generally consist of a dielectric ceramic matrix with embedded metal sheet electrodes of some μm thickness and some 10 μm of distance. In manufacturing such capacitors, suitable pastes of powdered ceramic matrix precursor material and suitable pastes of a metal powder are alternatively laminated on each other. Sometimes there is also provided a thin intermediate material. After lamination the laminate is dried and heated to about 300 to 450° C. (normally under air) to decompose the organic binder of the pastes. Thereafter the laminate is further heated under vacuum or inert gas atmosphere to about 1000 to 1350° C., mostly to at least 1200° C., for sintering and formation of the ceramic dielectric material.

During the decomposition step there is a risk that the metallic powder of the internal electrode material is oxidized, which will be deoxidized during heating to the sintering temperature. Deoxidation during sintering leads to shrinkage of the internal electrode causing cracks and delamination of the capacitor and high percentages of rejections from the manufacturing process.

Most of the multilayered ceramic chip capacitors use Pd or Pd alloys as the internal electrode material, which is sufficiently resistant to oxidation, whereby deoxidation shrinkage is avoided.

Recent developments try to replace the precious Pd metal with Base Metal Electrode (BME) materials such as Ni or Cu with small alloying additives such as Mg, Ca (U.S. Pat. No. 6,162,277 to Toshima et al.) or 95% Ni having at least one alloying additive of Mn, Cr, Co, Al or P (U.S. Pat. No. 5,319,517 to Nomura et al.).

OBJECTS OF THE INVENTION

An object of the present invention is to provide a particulate base metal electrode material useful for internal electrodes of laminated ceramic capacitors providing for an improved resistance to oxidation.

Another object of the present invention is to provide Base Metal powders, which after sintering in an MLCC capacitor provide good or at least acceptable electronic conductivity.

Another object of the present invention is to provide for a multilayer ceramic chip capacitor being less prone to cracking.

Another object of the invention is to reduce the number of rejections of MLCC capacitors having Base Metal electrodes.

Other objects, advantages and features of the present invention will become more apparent upon reading of the following non-restrictive description of preferred embodiments thereof, given by way of example only with reference to the accompanying drawings.

SUMMARY OF THE INVENTION

According to the broad concept presented, the present invention comprises alloy powders containing at least two alloying elements selected from the group of Ni, Cu, Cr, Sn, Mn, Co and W comprising:

1 to 99% by weight of nickel,
1 to 99% by weight of copper,
6 to 60% by weight of chromium,
6 to 15% by weight of tin,
6 to 15% by weight of manganese,
6 to 15% by weight of cobalt, and/or
6 to 15% by weight of tungsten.

Said alloy may additionally contain at least one of the elements (other than the at least two alloying elements mentioned above) selected from Ag, Al, Au, B, Be, Ca, Ce, Co, Cr, Cu, Fe, Ge, Hf, Mg, La, Nb, Ni, Mn, Mo, Si, Sn, P, Pd, Pt, Ta, Ti, V, W, Y, Zn and Zr in an amount of about 0,1 to 20% by weight based on total metal. The additional alloying elements may be present in an amount of 0,1 to 20% by weight based on the total metal. Preferably at least two of the additional alloying elements are present in the alloy powder. The total amount of additional alloying elements in the alloy powder is preferably less than 6% by weight based on the total metal.

Preferred binary alloy powders comprise nickel-copper alloys having 1-99% by weight of nickel, more preferably 6-94% by weight of nickel, particularly preferred 6-40% by weight of nickel or 6-40% by weight of copper and most preferred 15 to 30% by weight of Ni; nickel-chromium alloys having 6-60% by weight of chromium, more preferably less than 40% by weight of chromium; copper-tin alloys containing 2 to 15% by weight of tin, more preferably 3-12% by weight of tin, and particularly preferred more than 6% by weight of tin.

The preferred binary alloys may become ternary or quarternary alloys by including one or two of the additional alloying elements.

Preferred ternary alloy powders comprise copper-nickel-chromium alloys containing 50 to 94% by weight Cu, 0,2 to 40% by weight Ni, and 0,2 to 30% by weight Cr, preferably 60 to 90% by weight Cu, 2 to 25% by weight Ni, and 0,5 to 20% by weight Cr; copper-nickel-tin alloys containing 60 to 95% by weight Cu, 1 to 30% by weight Ni and 0,2 to 10% by weight tin, preferably 60 to 80% by weight Cu, 10 to 25% by weight Ni and 2 to 10% by weight tin.

The preferred ternary alloys may become quarternary alloys by including one of the additional alloying elements.

The powders according to the invention preferably have a particle size as derived from measurement of the specific surface area according to the BET method of 100 to 700 nm, preferably below 600 nm, more preferably from 100 to 500 nm. For practical reasons resulting from manufacturing methods of MLCC capacitors, presently particles sizes of 250-400 nm are of particular use, however improved such methods which are already experimentally in use will allow for use of powders in the range of 100 to 300 nm. Preferably the powders of the invention have substantially spherical shape.

Also, there is disclosed an alloy powder comprising copper and at least one alloying element wherein the temperature at which oxidation occurs is at least about 250° C., preferably between about 325° C. and about 400° C.

Furthermore, there is disclosed a base metal alloy powder comprising nickel and at least one alloying element wherein the temperature at which onset of oxidation occurs is at least about 500° C., preferably between about 520° C. and about 600° C.

Additionally, there is disclosed a laminated ceramic capacitor with an internal electrode wherein the electrode is fabricated from the above alloy powders.

DETAILED DESCRIPTION OF AN ILLUSTRATIVE EMBODIMENT

Figure 1:
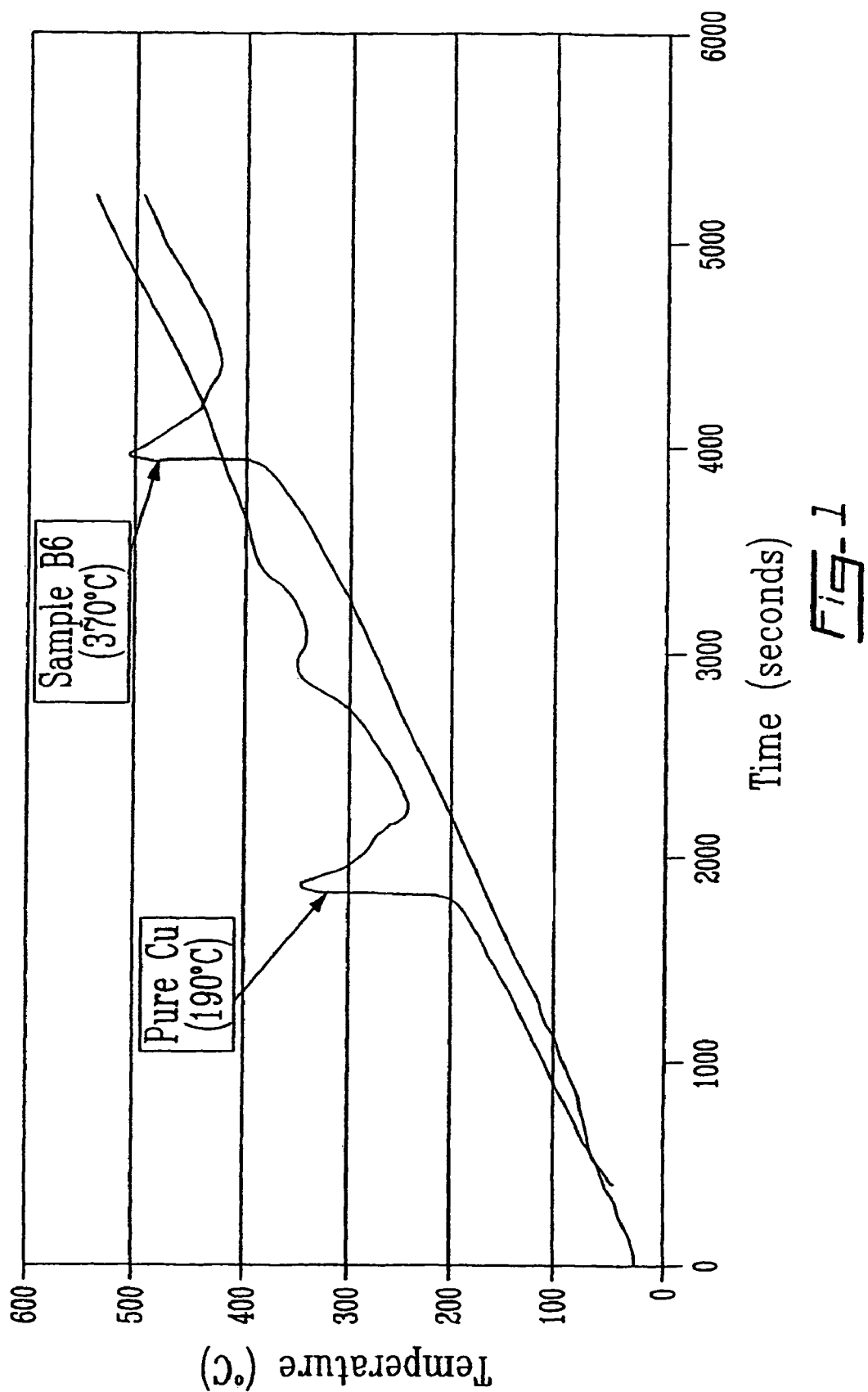
FIG. 1 is a graph illustrating the increase in the temperature of onset of oxidation between a base metal alloy powder fabricated using copper and a base metal alloy powder fabricated using a copper-nickel alloy.

An illustrative embodiment of a laminated ceramic capacitor internal electrode material in accordance with the present invention will now be described.

The present invention concerns fine base metal alloy powders, typically having a mean particle size of below 1 μm, comprising binary or ternary alloys of Ni, Cu, Cr and/or Sn and optionally containing minor amounts of additional alloying elements. The present invention also concerns capacitors whose internal electrodes are fabricated using these powders.

In general, fine metal and alloy powders are characterized by a large surface area. Since the oxidation reaction takes place on the exterior surface of the individual particles, the greater the surface area of the powder, the more prone it is to oxidize. Oxidation reactions are exothermic (i.e. they generate heat). Because of their very high surface areas, fine powders tend to readily react with oxygen. This rapid oxidation results in a sudden local high temperature rise, which in turn can lead to undesirable changes in sinterability and delamination of the MLCC. Depending upon the selection of alloying elements, in alloy powders, interdiffusion of the alloying elements will depend on their respective affinity to oxygen and the permeability of the oxide layer formed. If the interdiffusion velocity of the alloying elements is larger than the diffusion velocity of oxygen in the alloy, the metal of higher oxygen affinity may diffuse to the surface and fix oxygen at the surface, which leads to increased oxidation resistance of the powder. Maximum oxidation stability may occur at certain alloying ratio of the alloying elements and may not be achieved at complete segregation of the alloying elements. The situation is more complicated in the case of more than two alloying elements due to the relative influence of the alloying partners to each other as regards diffusivity and oxygen affinity.

The powders used in the fabrication of the internal electrode may be manufactured according to any known method of manufacture of fine particle powders, such as gel precipitation method with subsequent reduction of the precipitate, CVR methods by evaporation of suitable metal compounds such as chlorides in hydrogen containing gas atmosphere and condensation of metal powder, evaporation or liquefaction of metals in a plasma reactor and controlled condensation or solidification of metals. In an illustrative embodiment, the preferred method according to the invention is a transferred arc plasma method as disclosed in WO 00/10756 (corresponding to U.S. Pat. No. 6,379,419 to C. Celik et al.), the disclosure of which is included herein by reference.

Although most of these methods are disclosed for the manufacture of pure metal powders only, there is no principal difficulty in modifying these methods to allow the manufacture of alloys of defined composition. For example, co-precipitation in the gel precipitation process is well known. In CVR methods either mixtures of the precursor compounds may be evaporated from a single source or separate evaporators may be used and the reactant gases may be introduced into the reaction and condensation tube via separate inlets into the tube.

According to a preferred process of manufacture fine metal alloy powders are produced by means of a transferred arc plasma system, which process comprises the steps of: (a) continuously providing a mixture or alloy of metals to be vaporized in a transferred arc plasma reactor; (b) striking an arc between the metals and a non-consumable electrode in a straight polarity configuration to generate a plasma having a temperature sufficiently high to vaporize the metals and form a vapor thereof; (c) injecting a diluting gas heated to a temperature of at least 1000° K into the plasma reactor; (d) transporting the vapor by means of the plasma gas and the diluting gas (both designated as carrier gas) into a thermostatisized tube wherein the temperature is controlled at between 1000 and 1500° C. to control particle growth and crystallization during passage of the carrier gas through the tube; (e) introducing the carrier gas with entrained alloy particles into a quench tube with injection of a cooling fluid directly into the carrier gas, preferably in a sequence of cooling fluid inlets along the quench tube; (f) optionally introducing oxygen in an amount sufficient to effect surface oxidation of the entrained alloy powders as an additive to the quench fluid supplied to at least at the first cooling fluid inlet; and (g) separating the powder particles from the carrier gas and the cooling fluid.

Preferably the plasma gas, diluting gas and cooling fluid are either argon, nitrogen or another inert gas mixture with argon as the preferred gas.

In the preferred transferred arc plasma method evaporation occurs from a melt of the metal struck by the plasma arc. The melt has a composition different from the composition of the desired alloy powder in order to compensate for different evaporation rates of the alloying elements. Preferred is the continuous production method also disclosed in WO 00/10756, wherein the alloying elements are continuously fed into the crucible of the plasma chamber at the desired alloying ratio, preferably in the form of prealloyed material.

Following start up and after expiry of an initial period of time the composition of the melt will stabilize and assume a composition from which the desired alloy evaporates. If the required melt composition is known, the crucible may be filled at the start of production with a composition from which the desired alloy composition evaporates. As is known in the art, the required melt composition can roughly be estimated from known vapor pressure versus temperature relations of the alloying elements. Principally, it is also possible to have two or more plasma chambers from which the alloying elements are separately evaporated with introduction of the gases into a common condensation and cooling tube.

Powders obtained by this preferred plasma process are particularly low in sulfur, chlorine and carbon impurities.

These preferred products have chlorine contents of below 10 ppm, particularly preferably below 5 ppm, and sulfur contents of below 25 ppm, particularly preferred below 10 ppm, and carbon contents of between 85 and 600 ppm, preferably below 300 ppm.

The crucible from which the metals are evaporated preferably consists of zirconium oxide. The use of this crucible material results in a certain specific level of zirconium being present in the manufactured alloy powders of 15 to 175 ppm, preferably of up to 60 ppm.

A number of samples were prepared in order to illustrate the invention. These examples are intended to disclose the invention in more detail without limiting the generality of the disclosure hereof.

An experimental set up as disclosed in WO 00/10756 has been used. Prealloyed materials are filled into the crucible of the transferred arc system. The alloying ratio of the prealloyed precursor powder was roughly selected at a modified ratio of the desired alloying ratio taking into account different evaporation velocities of the elements from the molten alloy. Argon was used as the plasma torch gas, the diluting gas and the cooling gas.

Table 1 shows the composition of the starting melts during the various runs.

TABLE 1

| Run | Composition of starting melts in % by weight |
|-----|----------------------------------------------|
| A | 85 Cu + 15 Sn |
| B | 30 Cu + 69 Ni + 1 (Al + Si) |
| C | 50 Cu + 50 Ni |
| D | 42 Cu + 58 Ni |
| E | 95.1 Ni + 4.1 Cr + 0.8 Cu |
| F | 87.9 Ni + 11.9 Cr + 0.2 Cu |
| G | 73.6 Ni + 26 Cr + 0.4 Cu |
| H | 99 Cu + 1 Mn |
| J | 91 Ni + 9 Co |
| K | 40 Ni + 60 W |

Samples of pure copper and pure nickel were also used to provide a comparative analysis.

The powders were sampled multiple times during each production run in order to determine the characteristics of the produced powders. Due to the non-optimized precursor composition for a specific desired alloying ratio, differently composed alloy powders have been obtained during each single experiment.

The various powders obtained were analyzed for chemical composition, particle size and the temperature of onset of oxidation. Particle size was derived from the gaseous absorption analysis method known under the acronym of BET (for Brunaner, Emmett and Teller, the discovers of the method). The BET method is widely used for surface area determinations by computing the monolayer area. The temperature of onset of oxidation was determined by differential thermal analysis (DTA). The results of the BET analysis and DTA are shown in the following tables.

It will be clear to one of ordinary skill in the art that, depending on their electro-negativity, all metals tend to oxidize to some degree when exposed to air. This is due to the metal's propensity to donate electrons to whatever oxidant is present, in this case oxygen present in the air. Metals with a lower ionization potential such as copper have a greater affinity to oxidants present and therefore quickly oxidize. Although it is not clear the extent of the effects such oxidation could have on the present invention, to ensure good quality results prudent practice would suggest proceeding with the fabrication of the laminated ceramic capacitor internal electrode shortly following production of the alloy powders in order to limit the effects of this oxidation. In any case, it is believed that if fabrication of the electrodes is completed within one or two months of fabricating the powders no adverse effects should be present. Additionally, shelf life of the powders could be extended by taking appropriate measures to ensure that the powders are not exposed to oxidants.

In order to carry out the DTA a sample of the alloy powder was placed into a ceramic crucible which was in turn placed in an oven for heating. Air was injected into the oven at a constant rate and the sample gradually heated. As will be seen below, onset of oxidation can be readily recognized as a rapid increase in the temperature of the sample, the rapid increase a result of the exothermic nature of the oxidation reaction.

Preferred powders according to the invention preferably show an onset of oxidation of at least about 325° C. Powders with copper as the major alloying element are useful and feasible also with lower temperature of onset of oxidation of at least about 250° C., although onset of oxidation temperatures of at least about 325° C. are particularly preferred. It is difficult to achieve onset of oxidation temperatures of above 400° C. with copper as the major alloying element. On the other hand, when nickel is used as the major alloying element, preferred onset of oxidation temperature is at least about 500° C., particularly preferred at least about 520° C. although onset of oxidation temperatures of up to 600° C. are easily achieved.

Table 2 shows the results for a series of copper metal powders alloyed with different weights of a variety of other metals, including tin, nickel and lesser amounts of aluminum and silicon. Table 3 shows the results for a series of nickel metal powders alloyed with different weights of chromium and copper. Finally, Table 4 discloses the results for a copper metal powder alloyed with manganese and a nickel metal powder alloyed with cobalt (J1) and tungsten (K1).

All samples had a chlorine content of about 3 ppm, a sulfur content of about 10 ppm, and a zirconium content of between 35 and 50 ppm.

TABLE 2

| Powder | Composition (% by weight) | | | | | | | Particle | Onset of |
|--------|---|---|---|---|---|---|---|---|---|
| Run/ sample | Cu wt % | Sn wt % | Ni wt % | Al ppm | Si[1] ppm | O ppm | C ppm | Size nm | Oxidation ° C. |
| Pure Cu | 100 | — | — | — | — | 5500 | 150 | 407 | 180 |
|  | 100 | — | — | — | — | 5500 | 150 | 541 | 190 |
| A1 | 89.3 | 10.7 | <0.01 | <9 | 200 | 6100 | 600 | 534 | 2) |
| B1 | 82.2 | — | 15.2 | 560 | 1040 | 8135 | 687 | 193 | 161 |
| B2 | 76.8 | — | 22 | 680 | 2150 | 4984 | 162 | 346 | 168 |

TABLE 2-continued

| Powder | Composition (% by weight) | | | | | | | Particle | Onset of |
|---|---|---|---|---|---|---|---|---|---|
| Run/ sample | Cu wt % | Sn wt % | Ni wt % | Al ppm | Si[1]) ppm | O ppm | C ppm | Size nm | Oxidation °C |
| B3 | 73.5 | — | 25.1 | 730 | 2250 | 5420 | 180 | 424 | 366 |
| B4 | 70.2 | — | 28.3 | 780 | 2350 | 5850 | 197 | 415 | 398 |
| B5 | 68.7 | — | 29.7 | 755 | 1800 | 7080 | 230 | 343 | 371 |
| B6 | 67.3 | — | 31.1 | 730 | 1250 | 8300 | 267 | 273 | 370 |
| C1 | 81.2 | — | 18.5 | 4 | 1700 | 7220 | 200 | 339 | 327 |
| D1 | 84.4 | — | 14.8 | 1 | 1100 | 5620 | 200 | 489 | 331 |
| D2 | 83.1 | — | 16.5 | 6 | 1100 | n/a | n/a | 482 | 343 |
| D3 | 80.3 | — | 18.6 | 2 | 200 | 8490 | 200 | 458 | 344 |
| D4 | 80.8 | — | 18.8 | 8 | 1000 | 6840 | 200 | 545 | 357 |
| D5 | 77.3 | — | 22.3 | 9 | 1400 | n/a | n/a | 541 | 359 |

[1])unknown content in precursor material
2) small DTA response at 160° C., no main onset of oxidation below 550° C.

TABLE 3

| Powder | Composition | | | | | Onset of |
|---|---|---|---|---|---|---|
| Run/ Sample | Ni wt % | Cr wt % | Cu wt % | O ppm | Size nm | oxidation °C |
| pure Ni | 100 | — | — | 2500 to 5000 | 300 400 500 600 | 360-350 380-400 400-420 450-500 |
| E1 | 90.2 | 6.1 | 3.7 | n/a | 396 | 531 |
| E2 | 88.4 | 6.3 | 4.6 | 4710 | 464 | 534 |
| E3 | 90.3 | 6.7 | 2.4 | 4920 | 462 | 522 |
| F1 | 86.9 | 10.9 | 0.6 | n/a | 436 | 528 |
| F2 | 88 | 11 | 0.5 | n/a | 626 | 551 |
| G1 | 63.6 | 35.7 | 0.35 | 8780 | 606 | >580 |
| G2 | 61.5 | 37.3 | 0.8 | 9130 | 508 | 565 |
| G3 | 58.4 | 39.4 | 1.66 | 12120 | 295 | 568 |

TABLE 4

| Powder | Composition | | | | | | | Onset of |
|---|---|---|---|---|---|---|---|---|
| run/ sample | Ni wt % | Cu wt % | Mn wt % | Co wt % | W wt% | O ppm | Size nm | Oxidation °C |
| H1 | — | 88.7 | 10.9 | — | — | 7840 | 486 | 388 |
| J1 | 87.8 | — | — | 11.2 | — | 5180 | 510 | 568 |
| K1 | 89.7 | — | — | — | 9.6 | 6330 | 473 | 487 |

Referring now to FIG. 1, graphed results of the DTA for a pure copper (Cu) sample and a Copper-nickel alloy sample and clearly illustrating the effects of the invention is disclosed. Apparent from FIG. 1 is that the onset oxidation takes place at a much lower temperature for the pure copper powder than that of the copper alloy powder. It will be apparent to one of ordinary skill in the art that the peaks in temperatures of the powders indicated by the arrows are due to the exothermic effects of the oxidation reaction and therefore serve as an indicator of the onset of oxidation.

Figure 2:
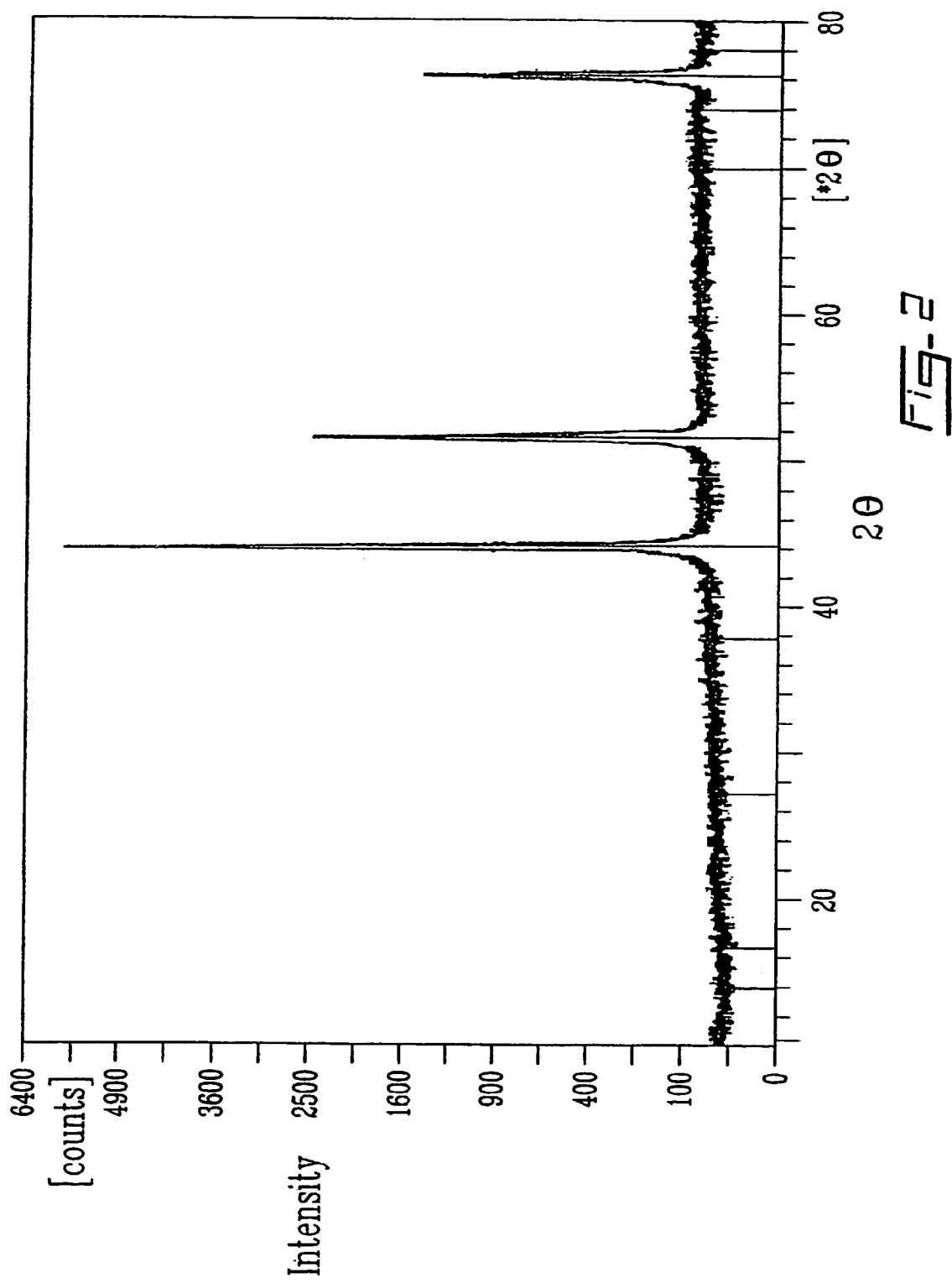
FIG. 2 is a graph illustrating the results of an X-ray diffraction analysis for the copper-nickel alloy powder of FIG. 1.

Referring now to FIG. 2, samples of the powder were subjected to x-ray diffraction analysis, using $Cu_{K\alpha}$ radiation. FIG. 2 shows such typical spectrum for sample E2, indicating excellent crystallinity of the powder. It will be apparent to one of ordinary skill in the art that the results graphed in FIG. 2 clearly show that a pure alloy forms and not a composite of the two metals.

Figure 3:
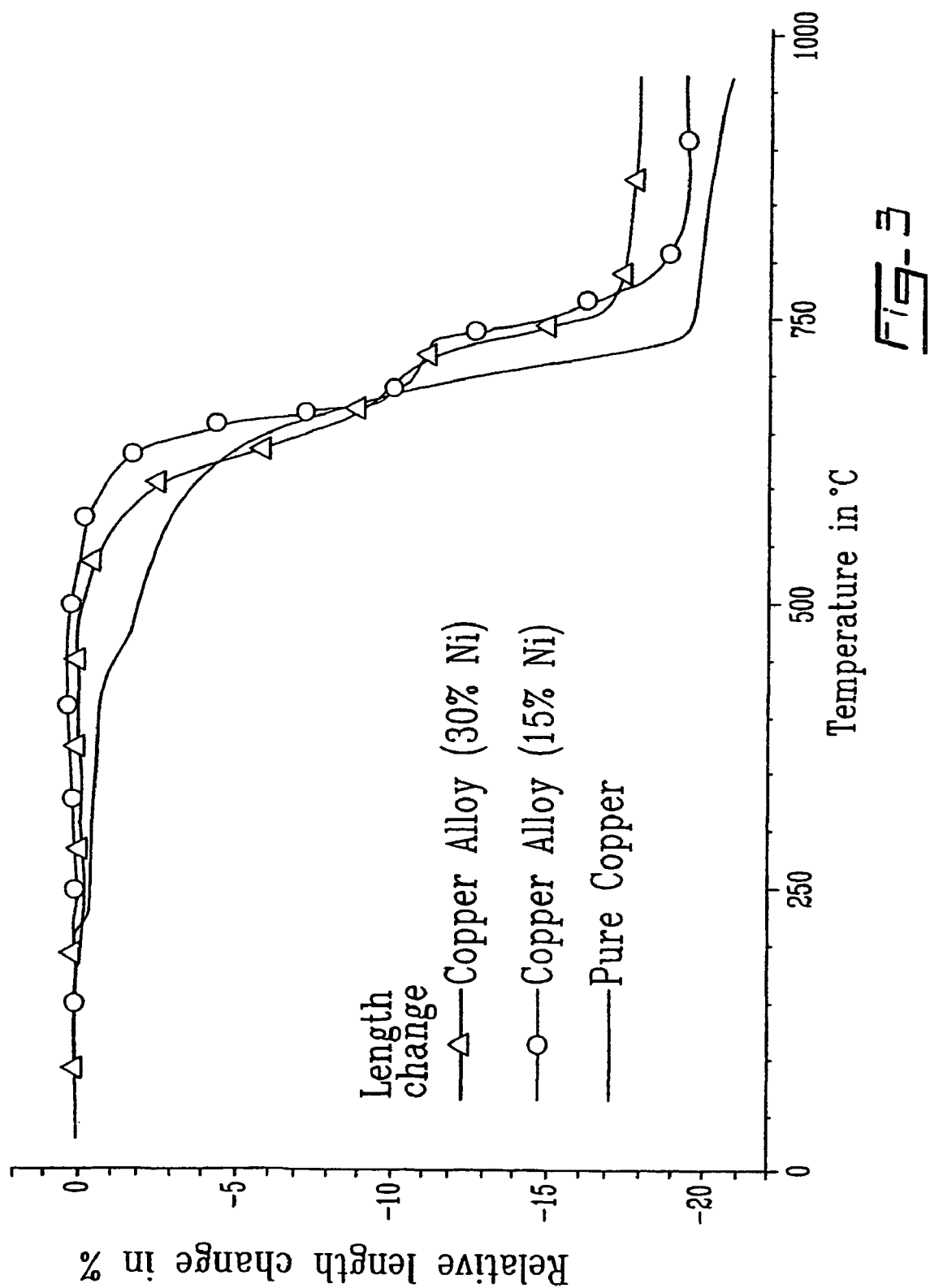
FIG. 3 is a graph illustrating (i) the resistance to the onset of oxidation, and (ii) the reduction in total shrinkage of an electrode fabricated using copper-nickel alloy powder as compared to that manufactured from a pure copper powder.

Referring now to FIG. 3, the relative change in length (i.e. shrinkage) of an electrode of a layered ceramic chip capacitor during sintering, the electrode being fabricated from both alloyed and non-alloyed powders is disclosed. The electrodes were fabricated according to the parameters disclosed in Table 5.

| Powder | Particle Size | Start of Sintering | End of Sintering | Relative Change in Length |
|---|---|---|---|---|
| Pure Copper | 418 nm | 250° C. | 850° C. | 21.0% |
| Copper Nickel Alloy (15% Ni) | 489 nm | 550-650° C. | 850° C. | 19.3% |
| Copper Nickel Alloy (30% Ni) | 343 nm | 500-600° C. | 900-950° C. | 17.7% |

It is apparent from FIG. 3 that the shrinkage experienced by both alloyed electrodes is between 8 and 15% less than that for the pure copper electrode.

Although the present invention has been described hereinabove by way of a preferred embodiment thereof, this embodiment can be modified at will, within the scope of the appended claims, without departing from the spirit and nature of the subject invention.

The invention claimed is:

1. A laminated ceramic capacitor comprising an internal electrode fabricated from an alloy powder comprising:
   at least about 58% by weight Ni,
   about 0.5% to about 5% by weight Cu, and
   about 6% to 40% by weight Cr,
   wherein said powder comprises particles which are substantially spherical and comprise an average particle size from about 25 nm to about 700 nm.

2. The laminated ceramic capacitor according to claim 1, wherein said alloy Further comprises at least one of the elements selected from Ag, Al, Au, B, Be, Ca, Ce, Co, Fe, Ge, Hf, Mg, La, Nb, Mn, Mo, Si, Sn, P, Pd, Pt, Ta, Ti, V, W, Y, Zn and Zr in an amount of about 0.1 to 20% by weight based on total metal.

3. The laminated ceramic capacitor according to claim 2, wherein said alloy further comprises at least two of said additional elements.

4. The laminated ceramic capacitor according to claim 2, wherein the said additional elements are present in said alloy in an amount of up to 6% by weight.

5. The laminated ceramic capacitor according to claim 1, wherein the alloy powder has an average particle size of about 100 nm to 700 nm.

6. The laminated ceramic capacitor of claim 1 wherein the temperature at which onset of oxidation occurs is at least about 500° C.

7. The laminated ceramic capacitor of claim 6, wherein the temperature at which onset of oxidation occurs is between about 520° C. and 600° C.

8. The laminated ceramic capacitor of claim 1, wherein said alloy further comprises between 15 ppm and 175 ppm Zr based on the total metal.

* * * * *

UNITED STATES PATENT AND TRADEMARK OFFICE
CERTIFICATE OF CORRECTION

PATENT NO. : 7,277,268 B2  Page 1 of 1
APPLICATION NO. : 10/826681
DATED : October 2, 2007
INVENTOR(S) : Cesur Celik et al.

It is certified that error appears in the above-identified patent and that said Letters Patent is hereby corrected as shown below:

Title Page ITEM (73)
Line 1, change "Candian Electronic Powers Corporation" to --Canadian Electronic Powders Corporation--

Signed and Sealed this

Twenty-fifth Day of December, 2007

JON W. DUDAS
*Director of the United States Patent and Trademark Office*